(No Model.) 2 Sheets—Sheet 1.
G. BEATTY.
REAPING MACHINE.
No. 247,001. Patented Sept. 13, 1881.
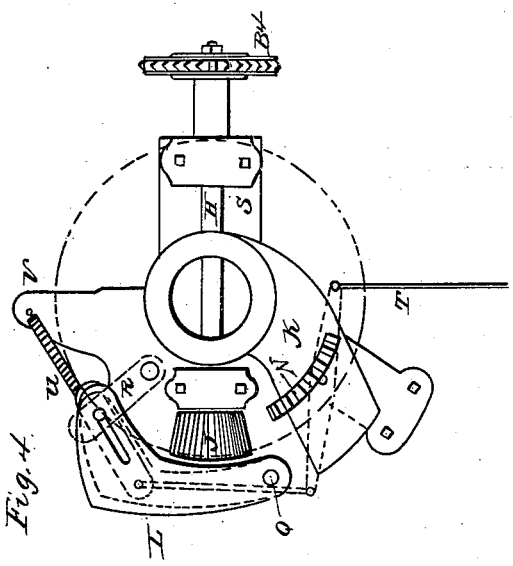
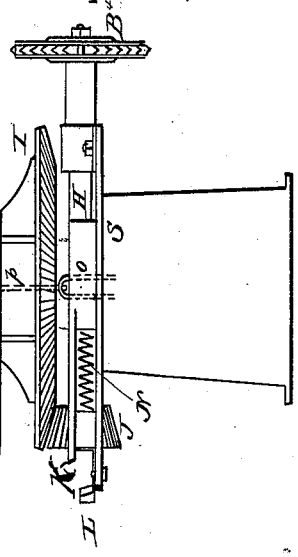
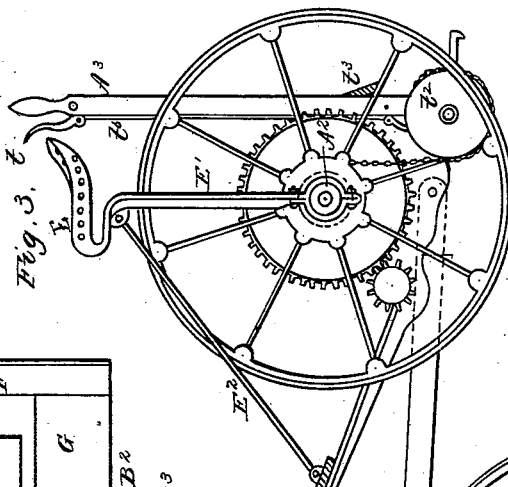
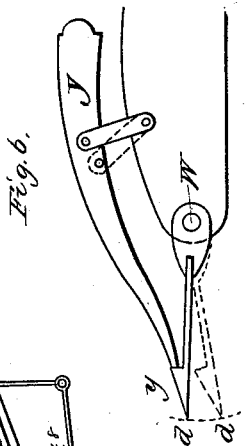
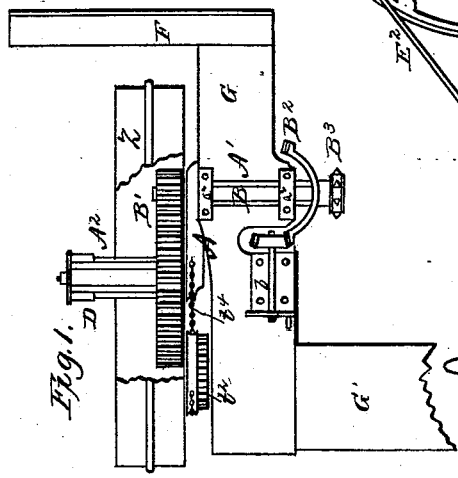
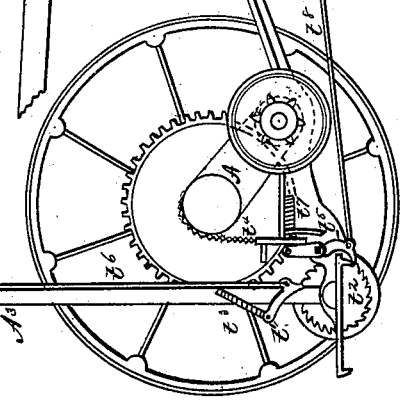
Witnesses,
P. L. Ourand
Alex. Scott
Inventor
George Beatty
by his Atty.
John J. Halsted (No Model.)
G. BEATTY.
REAPING MACHINE.
No. 247,001. Patented Sept. 13, 1881.
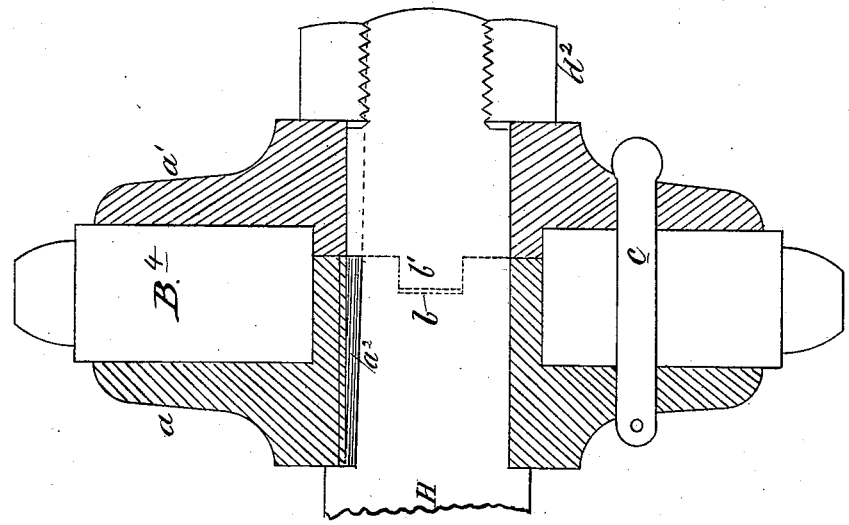
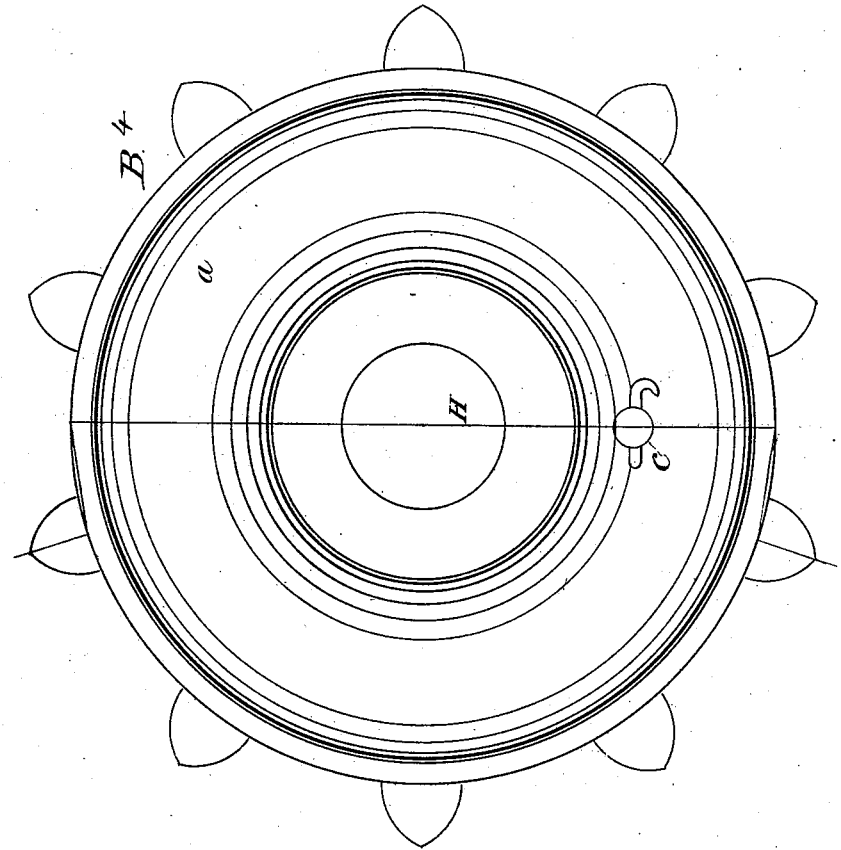
Witnesses
Thos Woodbridge
Harry Gill
Inventor
George Beatty
by William Gill
Atty

UNITED STATES PATENT OFFICE.

GEORGE BEATTY, OF FERGUS, ONTARIO, CANADA.

REAPING-MACHINE.

SPECIFICATION forming part of Letters Patent No. 247,001, dated September 13, 1881.

Application filed October 22, 1880. (No model.)

*To all whom it may concern:*

Be it known that I, GEORGE BEATTY, of the village of Fergus, in the county of Wellington, in the Province of Ontario, Canada, manufacturer of agricultural implements, have invented certain new and useful Improvements in Reaping-Machines; and I do hereby declare that the following is a full, clear, and exact description of the same, whereby others skilled in the art may make and use the same, reference being had to the accompanying drawings and to this specification.

My invention relates to reapers constructed with those modern improvements which characterize the advanced state of the art; and my improvements consist in a further simplification of construction and arrangement of various working parts of the machine, effecting a dimished operative resistance in those parts, a better quality of work in the field, and a greater durability of the machine.

In the accompanying drawings, Figure 1 is a plan view; Fig. 2, a side elevation, as seen from the rake side of the machine. Fig. 3 is also a side elevation, as seen from the side on which the driver sits. Fig. 4 is a plan view of rake-head; Fig. 5, a side elevation of rake-head and stand; Fig. 6, a side view of the grain-divider, and Figs. 7 and 8 enlarged views of chain-wheel.

Referring to Fig. 1, the frame is marked G, the knife-bar G'. A is the bent arm, with the cross-arm A' extending across the frame G, and secured by journal-boxes and bolts $a^2$ $a^2$, through which arm the shaft B of the spur-pinion B' passes. The other cross-arm, $A^2$, passes through the eye of driving-wheel Z, on the end of which arm the driver's seat is placed at D. On the end of shaft B the bevel-wheel $B^2$ is placed, with chain-pulley $B^3$, which drives the rake forming a part thereof. The short shaft, which drives the knives, is marked $b$.

Fig. 2 shows the lever $A^3$, for raising and lowering the machine, with a handle, $t$, pivoted near the top, a rod, $t^6$, and a pawl, $t'$, pivoted near the bottom and operating in a ratchet-wheel, $t^2$, and pressed therein by a spiral spring, $t^3$, as shown. On the back of the ratchet-wheel $t^2$ is a grooved pulley, on the circumference of which a chain, $t^4$, is attached, and also to the bent arm A, so that by pressing forward the lever $A^3$ the chain $t^4$ is wound up on the pulley aforesaid and will raise the machine as required, and it is held in position by the dog $t^5$ and spiral spring $t^7$. The pawl $t'$ is controlled by the pivoted handle $t$ and spring $t^3$. The dog $t^5$ is controlled by the rod $t^8$, and is operated by the foot of the driver.

Fig. 3 shows the seat E on the standard E', resting and secured on the end of arm $A^2$ by a clamp, in which the arm is free to turn, and by a brace, $E^2$, attached to the bar G at F and to the top of standard E'.

Fig. 4 shows the cross-shaft H, with chain-pulley $B^4$, by which the rake is driven from the chain-pulley $B^3$ on the back of bevel-wheel $B^2$ in Fig. 1, the rake-stand $s$ being located and secured, when in working position, on the knife-bar G', with the chain-wheel $B^4$ in line with chain-pulley $B^3$. The chain-wheel $B^4$ is provided in various sizes for changing the speed of the rake when desired, and it is secured in its place between two flanges, $a$ $a'$, one of which, $a$, with a notch, $b$, in the hub in front is keyed on the shaft H, the outer flange, $a'$, with the projection $b'$ filling said notch $b$, being held close to the flange $a$, as shown, by means of a nut, $d^2$, screwed on the end of the shaft, as shown in Fig. 8. This wheel $B^4$ is placed between the two flanges, and is secured against turning by a wooden pin, $c$, passing through it and through the flanges, and this pin, when obstructions are met with in the field, will readily break and allow the wheel to revolve loosely, and thereby save the machinery from damage. (See Figs. 7 and 8 for illustrations, on an enlarged scale, of the above-described wheel $B^4$.)

Fig. 4 also shows the driving-pinion J on the inner end of the shaft H, next to the knife-bar, to prevent the pinion J and crown-wheel I being worked out of gear. When the machine is in operation the peculiar position of the rake-arm is such that the outstretched arms are over the outer edge of the crown-wheel and press down this edge of the same, and consequently raise the inner edge, the folded-up arms being over the inner edge thereof, and with the pinion J below this inner edge of the wheel the teeth are brought nearly out of gear, and with the addition of the ordinary pressure upon the teeth from the moving force which is required to turn the wheel the teeth must frequently spring past each other and some of them become broken, whereas by extending the shaft H, as shown in the drawings, to the opposite side of the wheel, and placing the pinion J thereon, as shown, the weight of the outstretched arms keeps the teeth of the two wheels—viz., the pinion J and crown-wheel—at all times "full mesh" in gear, and any breakage of the same is also prevented.

Fig. 4 also shows the trip L and the plate K which controls the cam M, but is disconnected from the trip L to allow of the cam M being set to any position without affecting the trip L. The said plate K is adjusted by the ratchet N below this plate. This cam M may therefore be placed so as to allow the rake to drop at any required distance in front of the knife; but it will always trip at the same point over the table, so that, no matter what may be the position of the cam, the rake always trips in the same place over the table. A staple, O, is cast in the rake-stand, through which the shaft H passes, and a rod, $p$, hooked to the staple passes through the plate K and to the top of cam M, and is fastened by a nut on top, which thoroughly secures the same. The trip L is connected to the rake-stand at Q, and is moved in and out by a small crank, (shown by dotted line at R,) with a stud passing up through the slot in trip L, in which the stud plays to and from and actuates the trip. The small crank aforesaid is moved by a rod, T, attached to one end of the same and to a lever in foot-bar F, and by a spiral spring, $u$, at the other end connected to the rake-stand at V. This foot-bar is fastened across the extreme front of the end of frame G, to which a brace, E, is attached, and also to the top of standard E' of the driver's seat, as shown in Fig. 3.

Fig. 5 is an elevation of the rake-head, showing standard $s$, cross-shaft H, with chain-pulley $B^4$, ratchet N, trip L, crown-wheel I, and cam M. The devices shown in this figure, when in their working position, are placed on the knife-bar G, with the chain-pulley $B^4$ in line with the chain-pulley $B^3$, which drives the rake, as previously mentioned.

Fig. 6 is a side view of the grain-divider, and it is shown hinged to the grain-table at W, and with an arm connecting the same at a suitable point to allow of the elevation and depression of the divider between the points $d\ d$, as indicated by the dotted lines on the drawings.

Having thus described my invention, I claim—

1. The arm A, with cross-arm A' and cross-arm $A^2$, the cross-arm A' extending across the frame G, and secured to the same by the two journal-boxes with covers and bolts $a^2\ a^2$, the shaft B of the spur-pinion B' passing through and rotating in the same, the cross-arm $A^2$ passing through the driving-wheel Z, and sustaining on its outer end at D the seat E, secured by a clamp on the foot of standard E', which embraces the said arm $A^2$.

2. In combination with the frame G, the raising and lowering gear comprising the lever $A^3$, handle $t$, pawl $t'$, ratchet with pulley $t^2$, forming a part thereof, spring $t^3$, rod $t^6$, chain $t^4$, dog $t^5$, spring $t^7$, and rod $t^8$, as shown and described, and for the purposes set forth.

3. In combination, the seat E, as secured on the end of cross-arm $A^2$ by means of the standard E', and the front brace, $E^2$, connected with the foot-bar F at the front and with the top of standard E', all as set forth.

4. The cross-shaft H, with two journals, and passing through the rake-head $s$, with rake-pinion J on the end of the same next the knife and engaging with the crown-wheel on its under side.

5. The chain-wheel $B^4$, constructed and secured as described, with the flanges $a\ a'$, notched hub $b\ b'$, nut $d^2$, and pin $c$, as and for the purposes set forth.

6. In combination with cam M, the plate K, which controls said cam, disconnected from the trip L, and having a ratchet, N, on its under side, and the rake-stand $s$, having a ratchet on its upper side, these ratchets meshing into each other, the combination permitting the cam to be set to any required position without changing the position of the trip.

7. The staple O, cast in the rake-stand, and through which the shaft H passes, in combination with rod $p$, attached to said staple and passing through the eye of plate K and the web of cam M, with a nut on top for securing this cam.

8. The trip L, connected at one end to the rake-stand at Q, and provided at its other end with a slot, as shown, and with a pin or stud in said slot, in combination with the small crank R, spring U, rod T, and its connecting-lever, these parts being arranged and operating as shown and described.

GEORGE BEATTY.

Witnesses:
WILLIAM GILL,
THO. WOODBRIDGE,
HARRY WELLS.